United States Patent Office 3,828,007
Patented Aug. 6, 1974

3,828,007
PROCESS OF REACTING ISOCYANATE OR ISO-
THIOCYANATE AND COMPOSITIONS THEREFOR
Peter E. Throckmorton and William J. McKillip, Worthington, Ohio, and Robert C. Slagel, Pittsburgh, Pa., assignors to Ashland Oil, Inc., Columbus, Ohio
No Drawing. Filed Feb. 18, 1972, Ser. No. 227,618
Int. Cl. C08g 22/00, 22/04
U.S. Cl. 260—75 NB                          18 Claims

ABSTRACT OF THE DISCLOSURE

An organic compound containing isocyanate and/or isothiocyanate group is reacted with substance having reactive hydrogen as determined by the Zerewitinoff method in contact with a catalytic amount of organometallic compound having one of the following structural formulas:

(I) 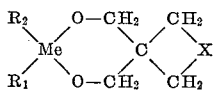

(II) 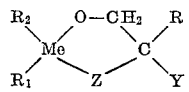

wherein Me is a Group IV–A metal; X is O, S, or $CH_2$; Y is either $NO_2$, $NH_2$, OH, $CF_3$ or $CH_2OH$; Z is $OCH_2$, or is NH, or $OCH_2$ when Y is $CH_2OH$; R is an alkyl group; and each $R_1$ and $R_2$ individually is alkyl, aryl, cycloalkyl, aralkyl, and alkaryl.

BACKGROUND OF THE INVENTION

The present invention is concerned with the catalysis of reactions involving isocyanates and/or isothiocyanates. More particularly this invention is concerned with carrying out such reactions in the presence of certain organometallic compounds of Group IV–A metals.

Polyurethanes are among the most widely used synthetic polymers. Polyurethanes have been suggested for use in such diverse areas as coatings, fibers, adhesives, foams, tires, and the like, depending upon the particular properties of the polyurethane. For the most part the commerically successful polyurethanes have been prepared from aromatic polyisocyanates such as toluene diisocyanate. One disadvantage of employing aromatic polyisocyanates or aromatic polyisothiocyanates is that the resulting polyurethanes, upon aging tend to yellow primarily due to oxidation. Such deterioration of the polymer can eventually result in rendering the polymer useless for its intended purpose. Therefore, it has been found necessary for many polyurethane applications to add a stabilizer to the polyurethane composition. The stabilizers, however, are not always completely effective in preventing yellowing of the polyurethane. Moreover, the use of stabilizers significantly adds to the cost of the polyurethane composition. In some instances, the increased cost may be such as to virtually exclude the use of the polyurethane material from a particular application.

One possible means to diminish the yellowing effect and correspondingly increase the longevity of polyurethane materials is to employ an aliphatic or saturated cycloaliphatic polyisocyanate or a corresponding polyisothiocyanate in place of the aromatic polyisocyanate or aromatic polyisothiocyanate in the preparation of the polyurethanes. In particular, those aliphatic polyisocyanates or aliphatic polyisothiocyanates which are fully hindered with hydrocarbon radicals provide the greatest stability against yellowing.

However, these hindered aliphatic polyisocyanates and hindered aliphatic polyisothiocyanates are relatively unreactive when compared with the aromatic isocyanates, the non-hindered aliphatic isocyanates, and the corresponding types of isothiocyanates. These hindered aliphatic isocyanates and hindered aliphatic isothiocyanates, in order to be of practical use to any appreciable extent, need to be rendered more reactive. Accordingly, continuing work is being done to provide catalysts which are effective for hindered aliphatic isocyanates and hindered aliphatic isothiocyanates as well as for the more widely employed aromatic isocyanates and isothiocyanates.

The present invention provides reactions involving isocyanates or isothiocyanates and particularly provide reactions involving hindered aliphatic isocyanates or hindered isothiocyanates employing new catalyst materials.

BRIEF DESCRIPTION OF INVENTION

The process of the present invention comprises reacting an organic compound containing at least one reactive NCA group wherein A is a member selected from the group of O and S with a substance having reactive hydrogen as determined by the Zerewitinoff method in contact with a catalytic amount of an organometallic compound represented by one of the following structural formulas:

(I) 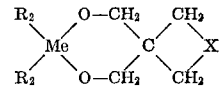

(II) 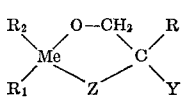

wherein Me is a Group IV–A metal; X is O or S or $CH_2$; Y is $NO_2$ or $NH_2$ or OH or $CH_2OH$; Z is $OCH_2$, or is NH or $OCH_2$ when Y is $CH_2OH$; each $R_1$ and $R_2$ individually is an alkyl group containing from 1 to about 22 carbon atoms, an aryl group containing from 6 to about 14 carbon atoms, cycloalkyl containing from about 3 to about 12 carbon atoms, an aralkyl group containing from 7 to about 18 carbon atoms, and an alkaryl group containing from 7 to about 18 carbon atoms; and wherein R is an alkyl group containing from 1 to about 22 carbon atoms. The present invention is also concerned with the curable composition containing the above organometallic compound as catalysts.

DESCRIPTION OF PREFERRED EMBODIMENTS

The organometallic compounds employed in the process of the present invention are represented by the following structural formulas:

(I) 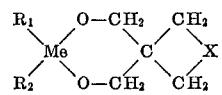

and (II) 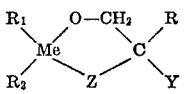

Me represents a Group IV–A metal such as Sn or Pb or Ge, and preferably is Sn.

X of formula I is either O or S or $CH_2$, and preferably is O.

Each $R_1$ and $R_2$ individually is either an alkyl group having from 1 to about 22 carbon atoms, or a cycloalkyl group having from about 3 to about 12 carbon atoms, or aryl having 6 to about 14 carbon atoms, or alkaryl group having from 7 to about 18 carbon atoms, or aralkyl group having from 7 to about 18 carbon atoms.

Some examples of suitable alkyl groups include methyl, ethyl, n-butyl, t-butyl, t-amyl, hexyl, 2-ethylhexyl, nonyl, and octadecyl. The preferred alkyl group contains from 1 to about 12 carbon atoms of which n-butyl is the most preferred.

Examples of some suitable aryl radicals include phenyl, naphthyl, phenanthryl, and anthracyl.

Suitable cycloalkyl radicals include cyclopropyl, cyclopentyl, cyclobutyl, cyclohexyl, cycloheptyl, cyclooctyl, and cyclododecyl.

Examples of some suitable alkaryl radicals include tolyl, xylyl, and cumyl. Examples of some suitable aralkyl radicals include phenylmethyl and naphthylethyl.

Usually, but not necessarily, both $R_1$ and $R_2$ are the same.

Y of formula II is an electron withdrawing polar radical which may be either $NO_2$ or $NH_2$ or $OH$ or $CF_3$ or $CH_2OH$. The preferred electron withdrawing polar radical is $NO_2$.

Z of formula II is —$OCH_2$— when Y is $NO_2$, $NH_2$, $CF_3$, or $OH$; and is —$OCH_2$—, or —$NH$— when Y is $CH_2OH$. Preferably Z is —$OCH_2$—.

R of formula II is an alkyl radical having up to 22 carbon atoms, and preferably from 1 to 12 carbon atoms. Some suitable examples of alkyl groups include methyl, ethyl, propyl, n-butyl, t-butyl, t-amyl, t-hexyl, 2-ethylhexyl, t-octyl, nonyl, decyl, dodecyl, and octadecyl. The most preferred alkyl groups are methyl and ethyl.

Some preferred compounds represented by formula I include 3,3-di-n-butyl-3-stanna-2,4-dioxa-spiro[5·3]-nonane;
3,3-di-n-butyl-3-stanna-2,4-dioxa-8-thia-spiro[5·3]-nonane;
3,3-di-n-butyl-3-stanna-2,4,8-trioxa-spiro[5·3]-nonane;
3,3-di-n-octyl-3-stanna-2,4-dioxa-spiro[5·3]-nonane;
3,3-diphenyl-3-stanna-2,4,8-trioxa-spiro[5·3]-nonane;
3,3-di-n-octyl-3-stanna-2,4-dioxa-8-thia-spiro[5·3]-nonane;
3,3-dicyclohexyl-3-stanna-2,4,8-trioxa-spiro[5·3]-nonane;
3,3-di-n-octyl-3-stanna-2,4,8-trioxa-spiro[5·3]-nonane;
3,3-dimethyl-3-plumba-2,4,8-trioxa-spiro[5·3]-nonane; and
3,3-di-n-butyl-3-germana-2,4-dioxa-8-thia-spiro[5·3]-nonane.

Some suitable compounds corresponding to formula II include 2,2-di-n-butyl-2-stanna-5-amino-5-methyl-1,3-dioxane;
2,2-di-n-butyl-2-stanna-5-methyl-5-nitro-1,3-dioxane;
2,2-di-n-butyl-2-stanna-5-ethyl-5-nitro-1,3-dioxane;
2,2-di-n-butyl-2-stanna-5-methyl-5-hydroxyl-1,3-dioxane;
2,2-di-n-butyl-2-stanna-5-methyl-5-trifluoromethyl-1,3-dioxane;
2,2-di-n-butyl-2-plumba-5-methyl-5-amino-1,3-dioxane;
2,2-di-n-butyl-2-plumba-5-methyl-5-nitro-1,3-dioxane;
2,2-di-n-butyl-2-germana-5-methyl-5-amino-1,3-dioxane;
2,2-di-n-butyl-2-germana-5-methyl-5-nitro-1,3-dioxane;
2,2-di-n-octyl-2-stanna-5-methyl-5-nitro-1,3-dioxane;
2,2-di-n-butyl-2-stanna-5-hydroxymethyl-5-methyl-1,3-dioxane; and
1,1-di-n-butyl-3-hydroxymethyl-3-methyl-5-oxa-1,2-stannazol.

Compounds corresponding to formula I can be prepared by reacting:

(1) A metal compound of the formula:

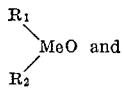

and (2) A dihydric alcohol of the formula:

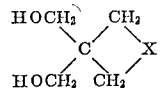

under condensation conditions. $R_1$, $R_2$, Me and X have the same meaning as set forth hereinabove. The metal compound and the dihydric alcohol are preferably reacted in stoichiometric amounts. However, excess quantities of either reactant can be employed and in some cases may be advantageous according to the reaction kinetics.

The condensation reaction is generally carried out in a suitable reaction diluent. The diluent can be any liquid provided it is inert (not reactive in any manner which will harm the reactants or product) and will dissolve or suspend the reactants. Examples of suitable diluents include aromatic hydrocarbons such as benzene, toluene, xylene, and tetrahydrofuran. The minimum amount of diluent is usually about 4 parts by weight per part of reactants. The maximum amount of diluent is only limited by practical considerations such as economics and equipment capacities. Usually, amounts of about 4 to about 10 parts by weight of diluent per part of reactants are sufficient. Preferably the amount of diluent is between about 4 parts and about 6 parts per part of reactants.

The process can be carried out over a range of temperatures. For example, the process can be carried out at a temperature from about 80 to about 150° C. The preferred temperature range varies from about 80° C. to about 110° C., and the most preferred temperature range is about 90° C. and about 100° C. It is preferred that the reaction be carried out under reflux, primarily as a matter of process convenience. The time necessary to effect substantial completion of the reaction will vary, primarily dependent upon the particular reactants, temperatures, and the reaction environment. Usually the reaction time varies from about 3 to about 8 hours. About 4 hours is the reaction time which is most commonly used. Advantageously, the reaction is carried out under atmospheric pressure. Of course, higher or lower pressures can be employed when desired. The desired product can be separated from the reaction mass by cooling to room temperature in order to effect its precipitation. The precipitated product can be removed from the reaction mass by filtration. Of course, for extremely pure products it may be desirable to employ one or more washing steps, recrystallization, and drying.

Included among the suitable metal compounds that may be used as reactants in the above-described reaction are: di-n-butyl-stannic oxide; di-n-octyl-stannic oxide; dimethyl-stannic oxide; methyl n-butyl stannic oxide; dimethyl lead oxide; di-n-butyl germanium oxide; dimethyl germanium oxide; diphenyl stannic oxide; dicyclohexyl stannic oxide; dicyclobutyl stannic oxide; ditolyl-stannic oxide; and phenyl-n-butyl stannic oxide.

Included among the suitable dihydric alcohols which can be employed in the above-described process for preparing the materials of formula I are 1,1-bis-(hydroxymethyl)-cyclobutane; 3,3 - bis-(hydroxymethyl)-thietane; and 3,3-bis-(hydroxymethyl)-oxetane.

The compounds corresponding to formula II can be prepared in the same manner described above for the preparation of the compounds of formula I except that the alcohol corresponds to a di- or polyhydric alcohol of the following formula:

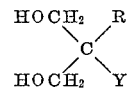

wherein Y and R have the same meaning as set forth hereinabove.

The same metal compounds as discussed above for preparing the compounds of formula I are suitable for preparing the compounds of formula II.

Some examples of di- and polyhydric compounds suitable for preparing the compounds represented by formula II include 2-nitro-2-methyl-1,3-propanediol; 2-amino-2-methyl-1,3-propanediol; 2-hydroxy-2-methyl-1,3-propanediol; 1,1,1-tris-(hydroxymethyl)-ethane; 2-trifluoromethyl-2-methyl-1,3-propanediol; 2 - nitro-2-ethyl-1,3-propanediol; 2-amino - 2 - ethyl-1,3-propanediol; 2-nitro-2-phenyl-1,3-propanediol; 2-amino - 2 - phenyl-1,3-propanediol; 2- nitro-2-cyclobutyl-1,3-propanediol; 2-amino-2-cyclobutyl-1,3-propanediol.

Methods for preparing various of the alcohols employed in preparing the compounds represented by formulas I and II are known. For example, the methods for preparing 1,1-bis-(hydroxymethyl)-cyclobutane; 3,3-bis-(hydroxymethyl)-thietene; and 3,3-bis-(hydroxymethyl)-oxetane are set forth in *Journal Elastoplastics*, Volume 2, July 1970, Polyurethane Plastics Containing Pendant Heterocyclic Groups, Throckmorten et al., pages 153–164, disclosure of which is incorporated herein by reference.

In addition, many of the alcohols employed in preparing the compounds of formula II are commercially available. Such commercially available alcohols include 2-nitro-2-methyl-1,3-propanediol; 2-amino-2-methyl-1,3-propanediol; 2-hydroxy-2-methyl-1,3-propanediol; and 1,1,1-tris-(hydroxymethyl)-ethane. Moreover, a suggested method for preparing the trifluoromethyl-substituted diols such as 2-trifluoromethyl-2-methyl-2,3-propanediol is the reaction in an aqueous medium of 1,1,1-trifluoropropane with formaldehyde under alkaline conditions.

The process of the present invention involves the reaction of an organic material which contains reactive isocyanate or isothiocyanate radicals with a substance having reactive hydrogen as determined by the Zerewitinoff method in contact with the cyclic organometallic compounds. The terms "isocyanate" and "isothiocyanate" are used herein to refer to mono- and poly-isocyanates and to mono- and poly-isothiocyanates, respectively. Accordingly, the present invention is generally applicable to the reaction of materials containing at least one —N=C=A group wherein A is O or S. Compounds within this general definition include monoisocyanates and monoisothiocyanates of the general formula $$R_3NCA$$

wherein $R_3$ is a hydrocarbon or substituted derivative thereof such as alkyl, cycloalkyl, alkenyl, alkynyl, aralkyl, aryl, alkaryl, or a substituted derivative thereof. Examples of such materials include methyl isocyanate, ethyl isocyanate, tert-butyl isocyanate, n-butyl isocyanate, isopropyl isocyanate, 1,1,3,3-tetramethyl butyl isocyanate, octyl isocyanate, octadecyl isocyanate, vinyl isocyanate, isopropenyl isocyanate, ethynyl isocyanate, benzyl isocyanate, phenyl isocyanate, vinyl phenyl isocyanate, tolyl isocyanate, ethyl isothiocyanate, and phenyl isothiocyanate.

Also included are polyisocyanates and polyisothiocyanates of the general formula:

$$R_4(NCA)_n$$

wherein $n$ is at least 2 and wherein $R_4$ is alkylene, substituted alkylene, arylene, substituted arylene, a hydrocarbon or substituted hydrocarbon containing 1 or more aryl-NCA bonds and 1 or more alkyl-NCA bonds, a hydrocarbon or substituted hydrocarbon containing a polarity of either aryl-NCA or alkyl-NCA bonds. $R_4$ can also include radicals such as —$R_4$—B—$R_4$— where B may be any divalent moiety as —O—, —O—$R_4$—O—, —CO—, —CO$_2$—, —S—, —S—$R_4$—S—, —SO$_2$—. Some examples of such compounds include hexamethylene diisocyanate, 1,8-diisocyanato-p-methane, xylylene diisocyanates, $$(OCNCH_2CH_2CH_2OCH_2)_2$$

1-methyl-2,4-diisocyanatocyclohexane, phenylene diisocyanates, tolylene diisocyanates, chlorophenylene diisocyanates, diphenyl methane-4,4'-diisocyanate, naphthalene-1,5-diisocyanate, triphenylmethane-4,4'-4''-triisocyanate, xylylene-α,α'-diisothiocyanate, and isopropyl benzene-α,α'-diisocyanate.

Further included are dimers and trimers of isocyanates and diisocyanates and polymeric diisocyanates of the general formula $(R_5NCA)_n$ and $[R_5(NCA)_n]_m$ in which $m$ and $n$ are two or more as well as compounds of the general formula $M(NCA)_n$ in which $n$ is one or more and M is a monofunctional or polyfunctional atom or group. Examples of this type include ethyl phosphonic diisocyanate, $C_2H_5P(O)(NCO)_2$; phenyl phosphonous diisocyanate, $C_6H_5P(NCO)$; compounds containing a Si-NCA group, isocyanates derived from sulfonamides $(R_5SO_2NCO)$, cyanic acid, thiocyanic acid and compounds containing a metal-NCA group such as tributyl tin isocyanate.

The present invention is particularly advantageous for reactions involving materials containing isocyanate groups which are highly hindered and also those which are aliphatic. It has surprisingly been found that the organometallic compounds employed in the present invention exhibit outstanding catalytic properties when employed in reactions wherein the isocyanate-containing compound contains fully hindered aliphatic isocyanate groups. Of particular importance is the use of the organometallic compounds to catalyze reactions between isocyanates produced by thermalizing compounds or polymers containing the group:

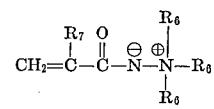

wherein each $R_6$ individually is an alkyl containing 1 to 6 carbon atoms or hydroxyalkyl usually containing 2 to 18 carbon atoms and preferably 2 to 6 carbon atoms, and $R_7$ is hydrogen or an alkyl containing from 1 to 4 carbon atoms, and a substance having reactive hydrogen as determined by the Zerewitinoff method. For instance, compounds can be polymerized or copolymerized and thermolyzed to form polymers containing the following recurring structure:

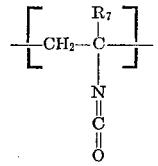

The active hydrogen-containing compounds that are capable of reacting with isocyanates generally include those compounds which give a positive test for reactive hydrogen as determined by the Zerewitinoff method. Typical of the active hydrogen-containing compounds whose reaction with isocyanates and isothiocyanates may be accelerated and in some instances even made possible are compounds containing an oxygen-hydrogen bond, such as water, alcohols, phenols, and carboxylic acid; compounds containing a nitrogen-hydrogen bond, such as ammonia, amines, amides, lactams, ureas, urethanes, allophanates, biurets, acyl ureas, thioureas, hydrazines, oximes, amidines, hydroxylamines, hydrazones, hydroxamic acids, nitramines, diazoamino compounds, and sulfonamides; compounds containing a sulfur-hydrogen bond, such as mercaptans, thiophenols and thioacids; halogen acids; compounds containing active methylene groups and compounds capable of forming enols such as acetone, malonic esters, acetoacetic esters, acetylacetone and nitromethane; and miscellaneous active hydrogen-containing compounds, such as acetylenic compounds and dialkyl phosphonates. Also included among the applicable active hydrogen-containing compounds are compounds containing two or more of any one or combination of active hydrogen groups already described. Examples include ethylene glycol, diethylene, glycol, hexamethylene glycol, glycerol, 1,2,6-hexanetriol, sorbitol, dextrin, starch, cellulose, polyvinyl alcohol, ethylenevinyl alcohol copolymers, cellulose acetate, shellac, castor oil, polyesters, alkyd resins, polyvinyl acetals, polyvinyl ketals, polyethers, polyetheresters, polyacrylic acids, ethylene diamine, hexamethylene diamine, ethanolamines, polyesteramides, poly(hexamethylene adipamide), wool, and proteins.

The method of the invention is particularly suitable for reaction of organic polyisocyanates with high molecular weight polymers having at least two end groups containing reactive hydrogen. A particular class of such polymers includes polyoxyalkylene polyols. These are long chain polyols containing one or more chains of connected oxyalkylene groups. Most desirably, these polyoxalkylene polyols are liquids having an average molecular weight in the range of 500 to 5,000.

Examples of these polyoxyalkylene polyols include polypropylene glycols having average molecular weights of 500 to 5,000, and reaction products of propylene oxide with linear diols and higher polyols, said higher polyols when employed as reactants giving rise to branched polyoxyalkylene polyols; and ethylene oxide-propylene oxide copolymers having average molecular weights of 500 to 5,000 and in which the weight ratio of ethylene oxide to propylene oxide ranges between 10:90 and 90:10, including reaction products of mixtures of ethylene oxide and propylene oxide in the said ratios with linear diols and higher polyols.

Examples of linear diols referred to as reactants with one or more alkylene oxides include ethylene glycol, propylene glycol, 2-ethylhexanediol-1,3 and examples of higher polyols include glycerol, trimethylolpropane, 1,2,6-hexanetriol, pentaerythritol and sorbitol.

Another class of polyoxyalkylene polyols are the so-called block copolymers having a continuous chain of one type of oxyalkylene linkage connected to blocks of another type of oxyalkylene linkage. Examples of such block copolymers are reaction products of polypropylene glycols having average molecular weights of 500 to 5,000 with an amount of ethylene oxide equal to 5 to 25% by weight of the starting polypropylene glycol. Another class of such block copolymers is represented by the corresponding reaction products of propylene oxide with polyethylene glycols.

Further examples of the class of polyoxyalkylene polyols include polyethylene glycols, polybutylene glycols and copolymers, such as polyoxyethyleneoxybutylene glycols and polyoxypropyleneoxybutylene glycols. Included in the term "polybutylene glycols" are polymers of 1,2-butylene oxide, 2,3-butylene oxide, and 1,4-butylene oxide.

Among the polyesters which are suitable reactants for isocyanates are those having reactive hydrogen-containing terminal groups, preferably predominantly hydroxyl groups. Polyesters are reaction products of polyols, such as the aforementioned aliphatic polyols and in particular the class of aliphatic polyols containing from 2 to 10 carbon atoms, with polycarboxylic acids having from 2 to 36 carbon atoms, e.g., oxalic acid, succinic acid, maleic acid, adipic acid, sebacic acid, isosebacic acids, phthalic acids, and dimer acids such as those obtained by coupling 2 molecules of linoleic acid.

Another class of polymers having terminal groups that contain reactive hydrogen atoms and are suitable for reaction with polyisocyanates are the lactone polymers, preferably those having molecular weights within the range of about 500 to 10,000. These include polymers formed by reaction of polyfunctional initiators having reactive hydrogen atoms with one or more lactones, whereby the lactone rings are successively opened and added to one another as lactone residues to form long chains, as well as copolymers in which there are random or ordered distributions of opened lactone residues and alkylene oxides in the chain, and block copolymers thereof. The lactones that are particularly suitable in polymers and copolymers of this type are the epsilon-caprolactones, preferably the unsubstituted caprolactones and caprolactones having up to about three alkyl substituents on the ring. The lactone residues in copolymers may be linked by oxyalkylene chains derived from ethylene oxide, propylene oxide, butylene oxide or the like, and by polyoxyalkylene chains, e.g., polyoxypropylene, polyoxyethylene, polyoxybutylene chains or mixtures or copolymers thereof.

It is also to be understood that a compound containing reactive NCA groups and reactive hydrogen, such as a prepolymeric reaction product of any of the foregoing polymers with an isocyanate, can be reacted with itself or with a compound containing reactive hydrogen, such as water, a polyol or an amino-alcohol.

The organometallic compounds are generally employed in amounts ranging from about .01 to about 5% by weight based upon the weight of the isocyanate, isothiocyanate and active hydrogen containing substance. The preferred amounts of the organometallic compounds are between about .1 and 1% by weight of the isocyanate, isothiocyanate, and active hydrogen containing substance.

To further understand the present invention, the following non-limiting examples, wherein all parts are by weight unless the contrary is stated, are given:

EXAMPLE A

Preparation of 3,3-di-n-butyl-3-stanna-2,4-dioxa-spiro[5·3]-nonane

Into a reaction vessel equipped with a stirrer, a Dean-Stark trap and a reflux condenser are added 19.9 parts of 3,3-bis-(hydroxymethyl)-cyclobutane and 42.6 parts of dibutyl tin oxide. 440 parts of anhydrous benzene are then added forming a suspension of the reactants. The suspension is then refluxed for three hours during which time three parts of water are removed. At this time, the reaction medium is cooled to room temperature and 22.65 parts of a product in the form of fine white needles having a melting point of from 135 to 137° C. are precipitated out of the suspension and are recovered. The product is then recrystallized from benzene. The recrystallized product has am elting point of 137–139° C. The mother liquor is then heated to 85° C. to effect evaporation of the benzene and water whereby an additional 15.5 parts of product has a melting point of 137–139° C. The mother liquor obtained. This accounts for a total yield of about 64%. The product obtained is 3,3-di-n-butyl-3-stanna-2,4-dioxa-spiro[5·3]-nonane as determined by elemental analysis and infrared spectra. The spectrogram shows the product to be free of hydroxyl. The product corresponds to the following formula:

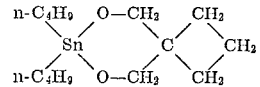

The elemental analysis is reproduced below:

|  | Calculated for $C_{15}H_{24}O_2Sn$ | Found |
| --- | --- | --- |
| C, percent | 48.4 | 48.11 |
| H, percent | 8.13 | 8.10 |
| Sn, percent | 34.2 | 35.67 |

EXAMPLE B

Preparation of 3,3-di-n-butyl-3-stanna-2,4-dioxa-8-thia-spiro[5·3]-nonane

In a reaction vessel equipped with a stirrer, a Dean-Stark trap and a reflux condenser are added 74.8 parts of dibutyl tin oxide and 42.2 parts of 3,3-bis-(hydroxymethyl)-thietane. 264 parts of anhydrous benzene are then added forming a suspension of the reactants. The suspension is refluxed for about 4 hours at which time the reaction is completed and 5.4 parts of water are removed. The reaction medium is cooled to room temperature whereupon a crystalline product precipitates out. 88 parts of this product are removed from the reaction medium by filtration and are then dried. The product has a melting point from 180 to 182° C. The product is then recrystallized from benzene. The recrystallized product has a melting point of 184–185° C. The mother liquor from the reaction mass is evaporated whereby an additional 17 parts of product are obtained resulting in a total yield of 95.2%. The product is 3,3-di-n-butyl-2,4-dioxa-3-stanna-8-thia-spiro[5·3]-noane as determined by elemental analysis and infrared spectra. The spectrogram shows the product to contain the trimethylene sulfide ring by strong absorption at wavelength of 8.4 microns and to be free of hydroxyl. The product corresponds to the following formula:

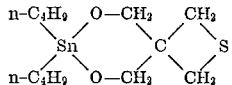

The results of the elemental analysis are reproduced below:

|  | Calculated for $C_{13}H_{26}O_2SnS$ | Found |
| --- | --- | --- |
| C, percent | 42.7 | 42.94 |
| H, percent | 7.2 | 7.00 |
| S, percent | 8.8 | 7.63 |
| Sn, percent | 32.5 | 36.54 |

EXAMPLE C

Preparation of 3,3-di-n-butyl-3-stanna-2,4,8-trioxa-spiro[5·3]nonane

In a reaction vessel equipped with a stirrer, a Dean-Stark trap, and a reflux condenser are added 58.2 parts of 3,3-bis-(hydroxymethyl)-oxetane and 122.5 parts of dibutyl tin oxide. 440 parts of anhydrous benzene are then added forming a suspension of the reactants. The suspension is then refluxed for 5 hours at which time the reaction is completed whereby 8.5 parts of water have been removed from the reaction mass. At this time a clear solution results which upon cooling to room temperature deposits the desired product in the form of a crystalline precipitate. 33.5 parts of the product are then removed from the reaction mass by filtration and are then dried. This product has a melting point of between 181 to 184° C. In addition, the mother liquor is evaporated whereby 90 more parts of a less pure product having a melting point of 150–164° C. are obtained. This results in a combined yield of about 71.6%. The product obtained is 3,3-di-n-butyl-3-stanna-2,4,8-trioxa-spiro[5·3]nonane as determined by elemental analysis and infrared spectra. The spectrogram shows the product to contain the trimethylene oxide ring by strong absorption at wavelengths of 10.3 microns and to be free of hydroxyl. The product corresponds to the following formula:

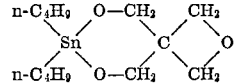

The results from the elemental analysis are reproduced below:

|  | Calculated for $C_{13}H_{26}O_3Sn$ | Found |
| --- | --- | --- |
| C, percent | 44.7 | 44.95 |
| H, percent | 7.5 | 7.41 |
| Sn, percent | 34.0 | 33.82 |

EXAMPLE D

Preparation of 2,2-di-n-butyl-2-stanna-5-methyl-5-nitro-1,3-dioxane

Into a reaction vessel provided with a stirrer, a Dean-Stark trap and reflux condenser are added 124.5 parts of dibutyl tin oxide and 67.6 parts of 2-nitro-2-methyl-1,3-propanediol. 880 parts of anhydrous benzene are then added to the reaction mass forming a suspension of the reactants. The reaction mixture is then heated under reflux for 12 hours. At this time 9 parts of water are collected. 132 parts of n-hexane are then added to the reaction mass and the reaction mass is then cooled to room temperature. Upon cooling to room temperature, 97.9 parts of the desired product in the form of white solid crystals with a melting point of 87–118° C. are obtained as a precipitate from the reaction mass. The product is separated from the reaction mass by filtration and is then dried. In addition, the mother liquor is left standing at a temperature of about 10° C. for 12 hours at which time an additional 11.4 parts of product having a melting point of 119° C. are obtained. An additional 22.7 parts of product are obtained by keeping the mother liquor at a temperature of about 10° C. for another 48 hours. This results in a combined yield of about 72.5%. The product obtained is 2,2-di-n-butyl-2-stanna-5-methyl-5-nitro-1,3-dioxane as determined by elemental analysis and infrared spectra showing strong absorptions at wavelengths of 6.47 and 7.37 microns. The spectrogram shows the product to be free of hydroxy. The product corresponds to the following formula:

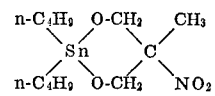

The results from the elemental analysis are reproduced below:

EXAMPLE D
Preparation of 2,2-di-n-butyl-2-stanna-5-methyl-5-nitro-1,3-dioxane

|  | Calculated for $C_{12}H_{25}O_4NSn$ | Found |
| --- | --- | --- |
| C, percent | 39.4 | 39.38 |
| H, percent | 6.8 | 7.12 |
| N, percent | 3.8 | 4.14 |
| Sn, percent | 32.4 | 29.24 |

EXAMPLE E

Preparation of 2,2-di-n-butyl-2-stanna-5-ethyl-5-nitro-1,3-dioxane

Into a reaction vessel provided with a stirrer, a Dean-Stark trap and reflux condenser are added 124.3 parts of dibutyl tin oxide and 74.6 parts of 2-nitro-2-ethyl-1,3-propanediol. 965 parts of anhydrous benzene are then added to the reaction mass forming a suspension of the reactants. The reaction mixture is then heated under reflux for 6 hours. At this time 9 parts of water are collected. The desired product is then separated from the reaction mixture by evaporation in a rotary vacuum type evaporator at 60° C. and 20 mm. of Hg whereby 193.8 parts of an amorphous product are obtained. The product obtained is 2,2 - di - n - butyl - 2 - stanna - 5 - ethyl - 5-nitro-1,3-dioxane as determined by elemental analysis and infrared spectra. The spectrogram shows the product to be free of hydroxyl. The product is soluble in carbon tetrachloride and the carbon tetrachloride solution of the product exhibits hydroxyl free infrared spectrogram. Also the infrared spectrogram shows strong absorption at wavelengths in the range of 6.45 to 6.53 microns and a supplemental absorption at wavelengths of 7.4 microns. Upon standing, for about 1 week at room temperature, the product crystallizes. The spectrogram of the crystals is the same as that of the amorphous product. The crystals begin to melt at 110° C. but solidify at 157° C. and then start to melt again with some solidification and discoloration. At 180 to 190° C. the material melts with possible decomposition to a dark red viscous liquid. The product corresponds to the following formula:

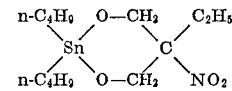

The results of the elemental analysis are reproduced below:

|  | Calculated for $C_{13}H_{27}O_4Sn$ | Found |
| --- | --- | --- |
| C, percent | 41.00 | 39.79 |
| H, percent | 7.17 | 7.19 |
| Sn, percent | 31.25 | 32.28 |

EXAMPLE F

Preparation of 3,3-di-n-octyl-3-stanna-2,4,8-trioxa-spiro [5·3]-nonane

In a reaction vessel equipped with a stirrer, a Dean-Stark trap, and a reflux condenser are added 10.9 parts of 3,3-bis-(hydroxymethyl)-oxetane and 30.9 parts of dibutyl tin oxide. 350 parts of anhydrous benzene are then added forming a suspension of the reactants. The suspension is then refluxed for about 6½ hours at which time the reaction is completed whereby about 1 part of water is removed from the reaction mass. At this time a clear solution results which upon cooling to room temperature deposits the desired product in the form of a white crystalline precipitate. 9.5 parts of the product are then removed from the reaction mass by filtration and are then dried. The product has a melting point of 140 to 144° C. In addition, the mother liquor upon standing at room temperature deposits 5 more parts of a less pure product in the form of a crystalline precipitate having a melting point of 115 to 120° C. The product is removed from the reaction mass by filtration and is then dried. Upon further standing at room temperature, the mother liquor deposits additional product in the form of a crystalline precipitate. 17 parts of this product are removed from the reaction mass by filtration and are then dried. This product has a melting point of 104 to 105° C. This results in a total combined product yield of about 80%. The product obtained is 3,3-di-n-octyl-3-stanna-2,4,8-trioxa-spiro-[5·3]-nonane as determined by elemental analysis and freedom from hydroxyl and the presence of oxetane by infrared spectra showing strong absorption at wavelengths of 10.3 microns, and gel permeation chromatography which shows a chromagram of 15.7° A. The product corresponds to the following formula:

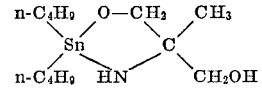

The results of the elemental analysis are reproduced below:

|  | Calculated for $C_{21}H_{46}O_3Sn$ | Found |
| --- | --- | --- |
| C, percent | 54.7 | 58.82 |
| H, percent | 9.18 | 9.34 |
| Sn, percent | 25.8 | 20.69 |

EXAMPLE G

Preparation of isomer mixture containing 2,2-di-n-butyl-2-stanna - 5 - methyl-5-amino-1,3-dioxane and 1,1-di-n-butyl-3-hydroxymethyl-3-methyl-5-oxa-1,2-stannazol Into a reaction vessel provided with a stirrer, a Dean-Stark trap and reflux condenser are added 12.46 parts of dibutyl tin oxide and 5.25 parts of 2-amino-2-methyl-1,3-propanediol. 176 parts of anhydrous benzene are then added to the reaction mass forming a suspension of the reactants. The reaction mixture is then heated under reflux for 1½ hours. At this time 0.9 part of water are collected. The desired product is then separated from the reaction mixture by evaporation of the mixture to 75 parts by volume in a rotary vacuum type evaporator at 60° C. and 20 mm. of Hg whereby 6.8 parts of product crystallize out. In addition, the mother liquor is evaporated at 50° C. and 20 mm. of Hg in a rotary vacuum type evaporator whereby 7.6 more parts of desired product are obtained. This results in a combined yield of about 85.7%. The product is then recrystallized from a benzene and chloroform mixture whereby a melting point of 140–150° C. is obtained. The product is an isomeric mixture of 2,2-di-n-butyl-2-stanna-5-methyl-5-amino-1,3-dioxane and 1,1-di-n-butyl-3-hydroxymethyl-3-methyl-5-oxa-1,2-stannol as determined by elemental analysis and infrared spectra. The product corresponds to the following formulas:

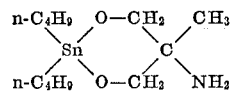

(2,2-di-n-butyl-2-stanna-5-methyl-5-amino-1,3-dioxane)

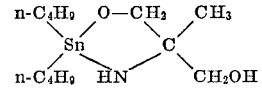

(1,1-di-n-butyl-3-hydroxymethyl-3-methyl-5-oxa-1,2-stannazol)

EXAMPLE H

Prepartion of 2,2-di-n-butyl-2-stanna-5-methyl-5-hydroxy-1,3-dioxane

Into a reaction vessel provided with a stirrer, a Dean-Stark trap and reflux condenser are added 124.5 parts of dibutyl tin oxide and 52 parts of 2-hydroxy-2-methyl-1,3-propanediol. 967 parts of anhydrous benzene are then added to the reaction mass forming a suspension of the reactants. The reaction mixture is then heated under reflux for 6 hours. At this time 9 parts of water are collected. The desired product is then separated from the reaction mixture by evaporation in a rotary vacuum type evacuator whereby 122 parts of product are obtained. The product obtained is 2,2-di-n-butyl-2-stanna-5-methyl-5-hydroxy-1,3-dioxane as determined by elemental analysis and infrared spectra. The product corresponds to the following formula:

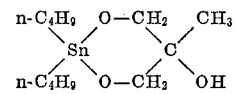

EXAMPLE I

Preparation of 2,2-di-n-butyl-2-stanna-5-methyl-5-hydroxymethyl-1,3-dioxane

Into a reaction vessel provided with a stirrer, a Dean-Stark trap and reflux condenser are added 124.5 parts of dibutyl tin oxide and 59 parts of 2-hydroxymethyl-2-methyl-1,3-propanediol. 967 parts of anhydrous benzene are then added to the reaction mass forming a suspension of the reactants. The reaction mixture is then heated under reflux for 6 hours. At this time 9 parts of water are collected. The desired product is then separated from the reaction mixture by evaporation in a rotary vacuum type evacuator whereby 126 parts of product are obtained. The product obtained is 2,2-di-n-butyl-2-stanna-5-methyl-5-hydroxymethyl-1,3-dioxane as determined by elemental analysis and infrared spectra. The product corresponds to the following formula:

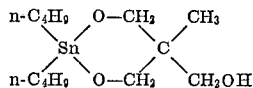

The following examples are presented to demonstrate the effectiveness of the novel compounds of the present invention as catalysts for reactions involving reactive isocyanate or isothiocyanate groups.

EXAMPLE I (A) Synthesis of random copolymer of dimethyl-2-(hydroxypropyl)amine methacrylimide, methyl methacrylate, n-butyl methacrylate, and n-butyl acrylate A solution of 26 parts of dimethyl-2-(hydroxypropyl)-amine methacrylimide, 20 parts methyl methacrylate, 27 parts n-butyl methacrylate, and 27 parts n-butyl acrylate are dissolved in 7 parts of methanol and 3 parts of n-butanol. The solution and 1 part of azobisisobutyronitrile are simultaneously added over a period of 1½ hours to a reaction vessel equipped with a stirrer and containing 80 parts of xylene and 10 parts n-butanol at a temperature of 95° C. The reaction vessel containing the xylene and n-butanol is purged with nitrogen before adding the solution. The polymerization is effected at the temperature of 95° C. for 20 hours under a nitrogen atmosphere. A polymer containing 26% dimethyl-2-(hydroxypropyl)-amine methacrylimide, 20% methyl methacrylate, 27% butyl methacrylate, and 27% butyl acrylate is obtained.

(B) Thermolysis of polymer from A

The solvent are removed from the polymer by distillation and a vigorous nitrogen sweep. The temperature during the distillation is permitted to rise to a maximum of 95° C. After this about 100 parts of xylene are added to increase the solvent content to 60%. The solution is then heated to 135° C. and maintained there for 2 hours until 130 parts of solvent are collected. The resulting polymer contains isocyanate groups as determined by infrared spectrum. The solid content of the polymer solution is reduced to 53% by the addition of xylene. The viscosity of the polymer at 53% solids is about 19 stokes. The polymer is a pale yellow material.

(C) Reaction of polymer from B (cross-link model)

32.6 parts of the 53% polymer solution are admixed with 45 parts of ethoxy ethanol, 34.6 parts of chlorobenzene solvent and 0.25 parts of 3,3-di-n-butyl-2,4,8-trioxa-3-stanna-spiro[5·3]-nonane. The mixture is then stirred adiabatically until, as indicated by disappearance of NCO observation in the infrared, the isocyanate has reacted with the hydroxyl group of the ethoxyethanol. As determined by infrared spectra analysis after 1 hour, the relative intensity of unchanged NCO to C=O of the product diminishes 44% in this catalyzed resin. The infrared spectra analysis is conducted by measuring the intensity of light absorbed at a wavelength of 4.4 microns for NCO groups and at 5.81 microns for C=O groups of the polymer.

This example is repeated except that the 3,3-di-n-butyl-2,4,8-trioxa-3-stanna-spiro[5·3]-nonane is replaced with 0.25 parts of 2,2-di-n-butyl-2-stanna-5-methyl-5-nitro-1,3-dioxane. After about 72 minutes as determined by infrared spectra analysis, the relative intensity of unchanged NCO to C=O of the product diminishes by 90.4%.

This example is repeated except that the 3,3-di-n-butyl-2,4,8-trioxa-3-stanna-spiro[5·3]-nonane is not added. After 1 hour, as determined by infrared spectra analysis, the relative intensity of unchanged NCO to C=O of the product diminishes only 6% in this uncatalyzed test.

EXAMPLE II

About 2.14 parts of the 53% polymer solution from Example I (B) are admixed with 3.23 parts of a hydroxyl containing phthalic anhydride-polyalkylene glycol type polyester resin having a hydroxyl value of 173.8. In addition, 0.2 parts of 3,3-di-n-butyl-2,4,8-trioxa-3-stanna-spiro-[5·3]-nonane are added to the composition. The mixture is then heated at 135° C. for about 1 hour at which time the isocyanate has reacted with the hydroxyl groups of the polyester as determined by infrared spectra analysis.

The following examples illustrate the effectiveness of the novel compounds of the present invention as catalysts for reactions involving isocyanate or isothiocyanate groups by the procedure described by Robins in the Journal of Applied Polymer Science, 9, 821 (1965).

EXAMPLE III 4.26 parts of isopropyl isocyanate and 4.54 parts of ethoxy ethanol in 50 parts of chlorobenzene are added to a reaction vessel equipped with a magnetic stirrer. The reaction vessel is insulated to prevent excessive heat losses. 0.25 parts of 3,3-di-n-butyl-3-stanna-2,4-dioxa-8-thio-spiro[5·3]-nonane is added to the reaction mixture which is stirred at an ambient temperature of about 25° C. The temperature is continuously recorded by use of a thermocouple and the temperature is continuously plotted against the time on a graph by an electronic recorder which responds to the output of the thermocouple. Since most of the effective reactions are completed in less than 1 minute, only a small amount of heat is lost to the surroundings. Accordingly, the determination is sufficient to establish relative reaction rates wherein the difference in reactivity is large. The procedure of the above example is repeated except that the catalyst is replaced with the following catalysts: 3,3-di-n-butyl-3-stanna-2,4,8-trioxa-spiro[5·3]-nonane; 3,3 - di-n-butyl-3-stanna-2,4-dioxa-spiro[5·3]-nonane; di-n-butyl-diethoxy tin; n-butyl trichlorotin; 2,2,7,7 - tetra-n-butyl - 2,7 - distanna-1,3,6,8-tetraoxa-cyclodecane; and di-n-butyl-diacetyltin.

The results of this example are illustrated in Table 1 below:

TABLE 1

| Catalyst | Maximum temperature rise $\Delta t$ (° C.) |
|---|---|
| 3,3 - di-n-butyl - 3 - stanna - 2,4 - dioxa - 8-thia-spiro[5·3]-nonane | 42.5 |
| 3,3 - di-n-butyl - 3 - stanna - 2,4,8 - trioxa-spiro[5·3]-nonane | 41 |
| 3,3 - di-n-butyl - 3 - stanna - 2,4 - dioxa-spiro[5·3]-nonane | 40 |
| di-n-butyl-diethoxy tin | 42.5 |
| n-Butyl-trichlorotin | 39 |
| 2,2,7,7 - tetra-n-butyl - 2,7 - distanna - 1,3,6,8-tetraoxa-decane | 39 |

EXAMPLE IV 4.92 parts of tert-butyl isocyanate and 4.54 parts of $CH_2CH_2$—O—$CH_2OH$ in 50 parts of chlorobenzene are added to a reaction vessel equipped with a magnetic stirrer. The reaction vessel is insulated somewhat to prevent excessive heat losses. 0.25 parts of 3,3-di-n-butyl-3-stanna-2,4-dioxa-8-thia-spiro[5·3]-nonane are added to the reaction mixture which is stirred at an ambient temperature of about 25° C. The temperature is continuously recorded by use of a thermocouple and the temperature is plotted against the time on a graph by an electronic recorder which responds to the output of the thermocouple. The procedure of the above example is repeated except that the catalyst is replaced with the following catalysts: 3,3 - di-n-butyl - 3 - stanna - 2,4,8 - trioxa-spiro[5·3]-nonane; 3,3 - di-n-butyl - 3 - stanna - 2,4-dioxa-spiro[5·3]-nonane; di-n-butyl-diethoxy tin; n-butyl-trichlorotin; 2,2,7,7 - tetra-n-butyl - 2,7 - distanna - 1,3,6,8-tetraoxa-cyclodecane; di-n-butyl-diacetyltin; and tetrachlorotin.

The results of this example are illustrated in Table 2 below:

TABLE 2

| Catalyst: | Maximum temperature rise $\Delta t$ ° C. |
|---|---|
| 3,3 - di - n - butyl-3-stanna-2,4-dioxa-8-thia-spiro[5·3]-nonane | 33 |
| 3,3 - di - n - butyl-3-stanna-2,4,8-trioxaspiro[5·3]-nonane | 33 |
| 3,3 - di - n - butyl - 3-stanna-2,4-dioxaspiro[5·3]-nonane | 33 |
| Di-n-butyl-diethoxy tin | 33 |
| n-Butyl trichlorotin | 23.5 |
| 2,2,7,7 - tetra - n - butyl-2,7-distanna-1,3,6,8-tetraoxa-cyclodecane | 33 |
| Di-n-butyl-diacetyltin | 17 |
| Tetrachlorotin | 10 |

EXAMPLE V 7.67 parts of 1,1,3,3-tetramethylbutyl isocyanate and 4.54 parts of ethoxyethanol in 50 parts of chlorobenzene are added to a reaction vessel equipped with a magnetic stirrer. The reaction vessel is insulated somewhat to prevent excessive heat losses. 1 part of 3,3-di-n-butyl-3- stanna-2,4-dioxa-8-thia-spiro[5·3]-nonane are added to the reaction mixture which is stirred at an ambient temperature of about 25° C. The temperature is continuously recorded by use of a thermocouple and the temperature is plotted against the time on a graph by a electronic recorded which responds to the output of the thermocouple. The procedure of the above example is repeated except that the catalyst is replaced with the following catalysts: 3,3 - di- n-butyl-3-stanna-2,4,8-trioxa-spiro[5·3]-nonane; 3,3 - di - n-butyl-3-stanna-2,4-dioxa-spiro[5·3]-nonane; di-n-butyl-diethoxy tin; n-butyl-trichlorotin; and 2,2,7,7-tetra-n-butyl-2,7-distanna-1,3,6,8-tetraoxa-cyclodecane.

The results of this example are illustrated below in Table 3.

TABLE 3

| Catalyst | Maximum temperature rise $\Delta t$ ° C. |
|---|---|
| 3,3 - di - n - butyl-3-stanna-2,4-dioxa-8-thia-spiro[5·3]-nonane | 23.5 |
| 3,3 - di - n - butyl-3-stanna-2,4,8-trioxaspiro-[5·3]-nonane | 28 |
| 3,3 - di - n - butyl-3-stanna-2,4-dioxaspiro-[5·3]-nonane | 26 |
| Di-n-butyl-diethoxy tin | 24 |
| n-Butyl-trichlorotin | 2 |
| 2,2,7,7 1 tetra - n - butyl-2,7-distanna-1,3,6,8-tetraoxa-cyclodecane | 2.5 |

EXAMPLE VI 4.5 parts of n-butyl isocyanate and 4.5 parts of ethoxy ethanol in 50 parts of chlorobenzene are added to a reaction vessel equipped with a magnetic stirrer. The reaction vessel is insulated to prevent excessive heat losses. About 1 part of a mixture of 2,2-di-n-butyl-2-stanna-5-methyl-5-amino-1,3-dioxane prepared according to the method of Example G is added to the reaction mixture which is maintained at a temperature of about 25° C. The temperature is continuously recorded by use of a thermocouple and the temperature is plotted against the time on a graph by an electronic recorder which responds to the output of the thermocouple. The temperature rises a maximum of 63.5° C. The procedure of the above example is repeated except that the catalyst is replaced with dibutyl tin dioctoate. The temperature rises a maximum of only 46° C.

EXAMPLE VII 7.65 parts of iso-octyl isocyanate and 4.5 parts of ethoxy ethanol in 50 parts of chlorobenzene are added to a reaction vessel equipped with a magnetic stirrer. The reaction vessel is insulated somewhat to prevent excessive heat losses. 1 part of a mixture of 2,2-di-n-butyl-2-stanna-5-methyl-5-amino-1,3-dioxane and prepared according to the method of Example G are added to the reaction mixture which is maintained at a temperature of about 25° C. The temperature is continuously recorded by use of a thermocouple and the temperature is plotted against time on a graph by an electronic recorder which responds to the output of the thermocouple. The temperature rises a maximum of 13° C. The procedure of the above example is repeated except that the catalyst is replaced with dibutyl tin dioctoate. The temperature rises a maximum of 3° C.

Di-n-butyl-diethoxytin, although demonstrating good catalytic activity for some of the isocyanates tested, possesses certain disadvantages as compared to the materials of the present invention. For instance, di-n-butyl-diethoxytin and other tin alkoxides such as 2,2,7,7-tetra-n-butyl-2,7-distanna-1,3,6,8-tetraoxa-cyclodecane hydrolyze much too quickly to provide catalysts which are stable enough to be handled in the usual mixing procedures for compounding and employing urethane compositions. Accordingly, such materials are not very suitable from a practical viewpoint.

On the other hand, the compounds of the present invention exhibit the unique combination of being sufficiently active to render the hindered isocyanate groups reactive and being sufficiently stable against hydrolysis as to be a practical commercial material. Also, di-n-butyl di-ethoxytin and other tin alkoxide compounds, such as 2,2,7,7-tetra - n-butyl-2,7-distanna-1,3,6,8-tetraoxa-cyclodecane, are much more difficult to prepare than the compounds of the present invention and accordingly would be much more expensive.

It is to be expected that numerous modifications will readily become apparent to those skilled in the art upon reading this description. All such modifications are intended to be included within the scope of the invention as defined in the appended claims.

What is claimed is:

1. Process for preparing polyurethane which comprises reacting an organic compound containing at least one reactive NCA group in which A is a member selected from the group consisting of O and S with a substance having reactive hydrogen as determined by the Zerewitinoff method in contact with an effective catalytic amount of an organometallic compound selected from the group consisting of compounds having the structural formulas:

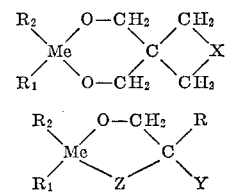

wherein Me is a Group IV–A metal; X is selected from the group consisting of O, S, and $CH_2$; Y is selected from the group consisting of $NO_2$, $NH_2$, OH, $CF_3$, and $CH_2OH$; Z is $OCH_2$ or is selected from the group consisting of $OCH_2$ and NH when Y is $CH_2OH$; R is an alkyl radical containing from 1 to about 22 atoms; and each $R_1$ and $R_2$ individually is selected from the group consisting of alkyl radicals containing from 1 to about 22 carbon atoms aryl radicals containing from 6 to about 14 carbon atoms; cycloalkyl radicals containing from about 3 to about 12 carbon atoms; aralkyl radicals containing from 7 to about 18 carbon atoms.

2. The process of claim 1 wherein said organometallic compound has the structural formula I.

3. The process of claim 2 wherein X is O.

4. The process of claim 2 wherein X is S.

5. The process of claim 2 wherein X is $CH_2$.

6. The process of claim 2 wherein each $R_1$ and $R_2$ is individually selected from alkyl radicals containing from 1 to about 12 carbon atoms.

7. The process of claim 2 wherein each $R_1$ and $R_2$ is n-butyl.

8. The process of claim 1 wherein said organometallic compound has the structural formula II.

9. The process of claim 8 wherein Y is $NO_2$.

10. The process of claim 8 wherein Y is $NH_2$.

11. The process of claim 8 wherein R is an alkyl radical containing from 1 to 12 carbon atoms.

12. The process of claim 8 wherein R is methyl or ethyl.

13. The process of claim 1 wherein Me is tin.

14. The process of claim 1 wherein said organometallic compound is 3,3-di-n-butyl-3-stanna-2,4-dioxa-spiro[5·3]-nonane.

15. The process of claim 1 wherein said organometallic compound is 3,3-di-n-butyl-3-stanna-2,4-dioxa-8-thia-spiro-[5·3]-nonane.

16. The process of claim 1 wherein said organometallic compounds is 3,3-di-n-butyl - 3 - stanna-2,4,8-trioxa-spiro-[5·3]-nonane.

17. The process of claim 1 wherein said organometallic compound is 2,2-di-n-butyl-2-stanna-5-methyl-5-nitrile-1,3-dioxane.

18. The process of claim 1 wherein said organic compound contains hindered aliphatic isocyanate or hindered aliphatic isothiocyanate group.

References Cited

UNITED STATES PATENTS

| | | | |
|---|---|---|---|
| 2,897,181 | 7/1959 | Windemuth | 260—22 R |
| 3,061,557 | 10/1962 | Hostettler et al. | 260—2.5 |
| 3,084,177 | 4/1963 | Hostettler et al. | 260—77.5 AB |
| 3,092,593 | 6/1963 | Nass et al. | 260—2.5 |
| 3,267,050 | 8/1966 | Kuryla et al. | 260—2.5 |
| 3,347,804 | 10/1967 | Buckley | 260—2.5 AB |
| 3,644,404 | 2/1972 | Throckmorton | 260—327 R |

OTHER REFERENCES

J. W. Britain et al., Journal of Applied Polymer Science, vol. 4, No. 11, pp. 207–211 (1960).

DONALD E. CZAJA, Primary Examiner

R. W. GRIFFIN, Assistant Examiner

U.S. Cl. X.R.

252—182; 260—75 NC, 77.5 AC, 77.5 AB, 327 R, 429.8, 429.7, 437 R, 858